United States Patent
Uehara et al.

(10) Patent No.: US 6,509,087 B2
(45) Date of Patent: Jan. 21, 2003

(54) HEAT SHRINKABLE, COEXTRUDED POLYETHYLENE FILM LAMINATE

(75) Inventors: Hideki Uehara, Takamatsu (JP); Yoshio Matsuda, Sakaide (JP); Kunio Sakauchi, Kagawa-ken (JP)

(73) Assignee: Okura Industrial Co., Ltd. (JP)

( * ) Notice: Subject to any disclaimer, the term of this patent is extended or adjusted under 35 U.S.C. 154(b) by 70 days.

(21) Appl. No.: 09/846,218

(22) Filed: May 2, 2001

(65) Prior Publication Data

US 2002/0187360 A1 Dec. 12, 2002

(51) Int. Cl.$^7$ ................................................ B32B 27/32
(52) U.S. Cl. ........................ 428/213; 428/516; 428/910
(58) Field of Search ................................ 428/516, 213, 428/910

(56) References Cited

U.S. PATENT DOCUMENTS

| | | | | |
|---|---|---|---|---|
| 4,777,095 A | * | 10/1988 | Kondo et al. ............ | 264/176.1 |
| 5,001,016 A | * | 3/1991 | Kondo et al. ............... | 428/340 |
| 5,614,315 A | * | 3/1997 | Kondo et al. ............... | 428/332 |
| 6,187,397 B1 | * | 2/2001 | Grangette .................. | 428/34.9 |
| 6,440,533 B1 | * | 9/2002 | Ray et al. ................... | 428/516 |

OTHER PUBLICATIONS

JP–2001–179905, Abstract only, Publication Date Mar. 7, 2001.*

* cited by examiner

Primary Examiner—D. Lawrence Tarazano
(74) Attorney, Agent, or Firm—Lorusso & Loud

(57) ABSTRACT

A heat shrinkable, coextruded polyethylene film laminate having two surface layers, and an intermediate layer interposed therebetween, wherein each of the surface layers comprises a linear low density polyethylene having a density of 0.910–0.930 g/cm$^3$ and a linear high density polyethylene having a density of 0.925–0.945 g/cm$^3$ and wherein the intermediate layer comprises a linear low density polyethylene having a density of 0.910–0.930 g/cm$^3$ and a linear very low density polyethylene having a density of 0.880–0.915 g/cm$^3$.

6 Claims, No Drawings

HEAT SHRINKABLE, COEXTRUDED POLYETHYLENE FILM LAMINATE

BACKGROUND OF THE INVENTION

This invention relates to a heat shrinkable, coextruded polyethylene film laminate suitable for the heat-shrink packaging of an article.

A heat-sealable, biaxially oriented polyethylene film laminate is known which includes a core layer of a relatively higher melting point polyethylene between two surface layer of a relatively low melting point polyethylene. A heat-resisting, biaxially oriented polyethylene film laminate is also known which includes a core layer of a relatively low melting point polyethylene between two surface layer of a relatively high melting point polyethylene. Because of poor stretchability of polyethylene in comparison with polypropylene resin, however, it is difficult to prepare the above polyethylene film laminates. In particular, the temperature range in which the stretching of polyethylene films can be carried out smoothly in a satisfactory manner is so narrow that it is difficult to continue stretching of the polyethylene films in a stable manner for a long time. As a consequence, known oriented polyethylene film laminates have defects that the thickness thereof is not uniform and that stretching cannot be continued in a stable manner for a long process run.

SUMMARY OF THE INVENTION

It is, therefore, an object of the present invention to provide a biaxially oriented, coextruded polyethylene film laminate which has uniform thickness.

Another object of the present invention is to provide a biaxially oriented, coextruded polyethylene film laminate which has good stretchability in both high and low temperatures and which can be continuously stretched in a stable manner even when the stretching temperature fluctuates.

It is another object of the present invention to provide a biaxially oriented, coextruded polyethylene film laminate of the above-mentioned type which shows good heat resistance and good surface slippage (good wrapping or packaging property).

In accomplishing the foregoing objects, there is provided in accordance with the present invention a polyethylene laminate film comprising two surface layers F1 and F2, and an intermediate layer M interposed therebetween, wherein the surface layer F1 comprises
   a linear low density polyethylene having a density $D_{AF1}$ g/cm$^3$ of 0.910–0.930 g/cm$^3$ and a linear high density polyethylene having a density $D_{CF1}$ g/cm$^3$ of 0.925–0.945 g/cm$^3$ and being present in an amount of $W_{CF1}$ % based on a total weight of the linear low density polyethylene having the density $D_{AF1}$ and the linear high density polyethylene having the density $D_{CF1}$, wherein the surface layer F2 comprises
   a linear low density polyethylene having a density $D_{AF2}$ g/cm$^3$ of 0.910–0.930 g/cm$^3$ and
   a linear high density polyethylene having a density $D_{CF2}$ g/cm$^3$ of 0.925–0.945 g/cm$^3$ and being present in an amount of $W_{CF2}$ % based on a total weight of the linear low density polyethylene having the density $D_{AF2}$ and the linear high density polyethylene having the density $D_{CF2}$, wherein the intermediate layer M comprises
   a linear low density polyethylene having a density $D_{AM}$ g/cm$^3$ of 0.910–0.930 g/cm$^3$ and
   a linear very low density polyethylene having a density $D_{BM}$ g/cm$^3$ of 0.880–0.915 g/cm$^3$ and being present in an amount of $W_{BM}$ % based on a total weight of the linear low density polyethylene having the density $D_{AM}$ and the linear very low density polyethylene having the density $D_{BM}$, and wherein the laminate film satisfies the following conditions (a) through (e) at the same time:

(a) $D_{CF1} - D_{AF1} \geq 0.010$,
(b) $D_{CF2} - D_{AF2} \geq 0.010$,
(c) $D_{AM} - D_{BM} \geq 0.010$,
(d) $0.01 \leq \{(D_{CF1} - D_{AF1}) \times L_{F1} \times W_{CF1}\} + \{(D_{CF2} - D_{AF2}) \times L_{F2} \times W_{CF2}\} \leq 0.20$,
(e) $0.05 \leq (D_{AM} - D_{BM}) \times L_M \times W_{BM}\} \leq 1.40$, where $D_{CF1}$, $D_{AF1}$, $D_{CF2}$, $D_{AF2}$, $D_{AM}$, $D_{BM}$, $W_{CF1}$, $W_{CF2}$ and $W_{BM}$ are as defined above and $L_{F1}$, $L_{F2}$ and $L_M$ represent as follows:

$L_{F1} = t_{F1}/(t_{F1} + t_{F2} + t_M)$,
$L_{F2} = t_{F2}/(t_{F1} + t_{F2} + t_M)$,
$L_M = t_M/(t_{F1} + t_{F2} + t_M)$, where $t_{F1}$, $t_{F2}$ and $t_M$ represent the thicknesses of the surface layer F1, surface layer F2 and intermediate layer M, respectively.

Other objects, features and advantages of the present invention will become apparent from the detailed description of the preferred embodiments of the invention to follow.

DETAILED DESCRIPTION OF THE PREFERRED EMBODIMENTS OF THE INVENTION

In the polyethylene film laminate according to the present invention, a linear low density polyethylene (hereinafter referred to as LLDPE) having a density of 0.910–0.930 g/cm$^3$ is used in each of surface layers F1 and F2 and in an intermediate layer M interposed therebetween. It is preferred that LLDPE have a melt index of 0.5–5.9 g/10 min for reasons of good stretchability. LLDPE is preferably a copolymer of ethylene with an α-olefin having 4–8 carbon atoms. Copolymers produced using a Ziegler Natta catalyst or a single site catalyst may be used for the purpose of the present invention.

In addition to LLDPE, each of the surface layers F1 and F2 contains linear high density polyethylene (hereinafter referred to as LHDPE) having a density of 0.925–0.945 g/cm$^3$. The intermediate layer M must contain linear very low density polyethylene (hereinafter referred to as VLDPE) having a density of 0.880–0.910 g/cm$^3$ in addition to LLDPE.

It is preferred that LVLDPE have a melt index similar to LLDPE and in the range of 0.5–5.0 g/10 min for reasons of good streatchability and of compatibility with LLDPE. LVLDPE is preferably a copolymer of ethylene with an α-olefin having 4–8 carbon atoms. Copolymers produced using a Ziegler Natta catalyst or a single site catalyst may be used for the purpose of the present invention.

It is preferred that LHDPE have a melt index similar to LLDPE and in the range of 0.5–5.0 g/10 min for reasons of good streatchability and of compatibility with LLDPE. LHDPE is preferably a copolymer of ethylene with an α-olefin having 4–8 carbon atoms. Copolymers produced using a Ziegler Natta catalyst or a single site catalyst may be used for the purpose of the present invention.

In the present invention, it is not necessary that the same polyethylene be used in the surface and intermediate layers of the same laminate. Thus, different LLDPEs can used in respective layers of the same laminate. Similarly, respective layers of the same laminate can contain different LVLDPEs and different LHDPES.

The surface layers F1 and F2 and the intermediate layer M of the laminate according to the present invention must meet with specific conditions. These conditions will be next described.

As described above, the surface layers F1 and F2 contain LHDPE in addition to LLDPE, while the intermediate layer M contains LVLDPE in addition to LLDPE. In this case, it is important that the following conditions (a) through (c) are met at the same time:

(a) $D_{CF1} - D_{AF1} \geq 0.010$, (b) $D_{CF2} - D_{AF2} \geq 0.010$, (c) $D_{AM} - D_{BM} \geq 0.010$, wherein $D_{CF1}$: density (g/cm$^3$) of LHDPE of surface layer F1

$D_{AF1}$: density (g/cm$^3$) of LLDPE of surface layer F1

$D_{CF2}$: density (g/cm$^3$) of LHDPE of surface layer F2

$D_{AF2}$: density (g/cm$^3$) of LLDPE of surface layer F2

$D_{BM}$: density (g/cm$^3$) of LVLDPE of intermediate layer M $D_{AM}$: density (g/cm$^3$) of LLDPE of intermediate layer M.

Namely, in each of the surface layers F1 and F2, the density of LHDPE must be greater by at least 0.010 g/cm$^3$ than that of LLDPE, in order to obtain good stretchability and heat resistance. At the same time, in the intermediate layer M, the density of LLDPE must be greater by at least 0.010 g/cm$^3$ than that of LVLDPE in order to obtain good stretchability.

Further, it is important that the following conditions (d) and (e) should be met simultaneously:

(d)

$0.01 \leq Z_{S1} + Z_{S2} \leq 0.20$, $Z_{S1} = (D_{CF1} - D_{AF1}) \times L_{F1} \times W_{CF1}$ $Z_{S2} = (D_{CF2} - D_{AF2}) \times L_{F2} \times W_{CF2}$ (e)

$0.05 \leq Z_M \leq 1.40$ $Z_M = (D_{AM} - D_{BM}) \times L_M \times W_{BM}$ where $D_{AF1}$, $D_{CF1}$, $D_{AF2}$, $D_{CF2}$, $D_{BM}$ and $D_{AM}$ are as defined above, $W_{CF1}$, $W_{CF2}$ and $W_{BM}$ represent as follows:

$W_{CF1}$: amount of LHDPE (% by weight) based on a total weight of LLDPE and LHDPE of the surface layer F1, $W_{CF2}$: amount of LHDPE (% by weight) based on a total weight of LLDPE and LHDPE of the surface layer F2, $W_{BM}$: amount of LVLDPE (% by weight) based on a total weight of LLDPE and LVLDPE of the intermediate layer M, and $L_{F1}$, $L_{F2}$ and $L_M$ represent as follows:

$L_{F1} = t_{F1}/(t_{F1} + t_{F2} + t_M)$, $L_{F2} = t_{F2}/(t_{F1} + t_{F2} + t_M)$, $L_M = t_M/(t_{F1} + t_{F2} + t_M)$, where $t_{F1}$, $t_{F2}$ and $t_M$ represent the thicknesses of the surface layer F1, surface layer F2 and intermediate layer M, respectively.

When $(Z_{S1} + Z_{S2})$ is smaller than 0.01, the range of temperature in which the laminate can be stretched in a stable manner at a high temperature is so small that it is difficult to stretch the laminate at such a high temperature for a long period of time. Further, the laminate becomes poor in heat resistance. When $(Z_{S1} + Z_{S2})$ is greater than 0.20, on the other hand, it is possible to stretch the laminate at a high temperature. However, the strechability becomes no good and the thickness of the stretched film becomes non-uniform. Very good stretchability and surface slippage (wrapping property) are obtainable when $(Z_{S1} + Z_{S2})$ is in the range of 0.04 to 0.12 and this range represents the preferred range.

When $Z_M$ is smaller than 0.05, the range of temperature in which the laminate can be stretched in a stable manner at a low temperature is so small that it is difficult to stretch the laminate at such a low temperature. When $Z_M$ is greater than 1.4, on the other hand, it is not possible to stretch the laminate at a low temperature in a stable manner. When a hard package is desired, it is preferred that $Z_M$ be in the range of 0.10 to 0.30. On the other hand, when a soft package is desired, such as for wrapping sheets or cards, it is preferred that $Z_M$ be in the range of 0.70 to 1.20.

If desired, one or more layers may be interposed between the surface layers S1 and S2. For example, a layer of a resin obtained from recycled laminates or noncompliant laminates may be incorporated into the laminate of the present invention as an additional intermediate layer. In such a case, the additional layer may be sandwiched between two intermediate layers M, with surface layers S1 and S2 being provided on opposite sides to form a five-layered laminate. The laminate generally has a thickness of 8–50 $\mu$m, preferably 10–35 $\mu$m. The thickness of each of the surface layers S1 and S2 is generally 5–33, preferably 10–25% of the total thickness.

Each of the surface layers S1 and S2 and the intermediate layer M may contain one or more conventional additives such as an antioxidizing agent, an antistatic agent, a lubricant, an antiblocking agent, a colorant and a filler. A crosslinking agent, a crosslinking accelerator, etc, may also be incorporated into the laminate to crosslink the laminate before or after stretching. Further, a resin such as a high pressure low density polyethylene having a density of 0.91–0.93 may be used in conjunction with LLDPE, LHDPE and/or LVLDPE in an amount of less than 15% by weight based on the laminate.

The laminate of the present invention may be prepared by any suitable conventional method such as coextrusion. The extruded sheet is stretched, preferably biaxially, by tentering or inflation method to obtain a heat-shrinkable, coextruded polyethylene film laminate suitable for the heat-shrink packaging of an article. Packages obtained by using the heat-shrinkable laminate of the present invention do not melt or whiten during their passage through a heat-shrinking tunnel. Further, the heat-shrunken films of the packages are free of non-shrunken portions and are maintained in a tense state.

The following examples will further illustrate the present invention. Parts and percentages are by weight.

EXAMPLE 1

A resin composition containing 90 parts of LLDPE having a density of 0.920 g/cm$^3$ and 10 parts of LHDPE having a density of 0.935 g/cm$^3$ was used for surface layers S1 and S2. A resin composition containing 70 parts of LLDPE having a density of 0.920 g/cm$^3$ and 30 parts of LVLDPE having a density of 0.900 g/cm$^3$ was used for an intermediate layer M. Each of the composition was charged in an extruder and coextruded through a circular die to form a tubular, three-layered laminate having a thickness ratio of S1:M:S2 of 15:70:15. The extrudate was rapidly cooled, stretched by 5 times the original length in each of the lateral and machine directions by inflation and then annealed to obtain a biaxially oriented laminate having a thickness of 19 $\mu$m.

The biaxially oriented laminate was evaluated for stability in stretching operation, uniformity in thickness and slippage. The results are summarized in Table 1. Evaluation is in accordance with the following ratings.

Stability

Inflation stretching for the production of the biaxially oriented laminate is continuously performed for 24 hours.

A: excellent (stretching is performed in stable manner and satisfactorily from industrial viewpoint)

B: no good (stretching is performed in unstable manner and not satisfactorily from industrial viewpoint)

C: poor (industrial production is impossible)

Uniformity

Uniformity in thickness of stretched laminate is checked by naked eyes and with a thickness gauge.

A: excellent (non-uniform stretching or non-uniform thickness is never observed with naked eyes or thickness gauge)

B: no good (non-uniformity is not observed with naked eyes but is observed by measurement with the gauge C: non-uniform thickness is observed with naked eyes Slippage Video tape cartridges are heat-shrink packaged with the laminate. The outer surfaces of packages are manually rubbed with each other to evaluate slippage.

A: slip

B: slightly slip

C: non-slip

EXAMPLE 2

Example 1 was repeated in the same manner as described except that a resin composition containing 70 parts of LLDPE having a density of 0.920 g/cm$^3$ and 30 parts of LHDPE having a density of 0.935 g/cm$^3$ was used for each of the surface layers S1 and S2. The results are summarized in Table 1.

EXAMPLE 3

Example 1 was repeated in the same manner as described except that a resin composition containing 30 parts of LLDPE having a density of 0.920 g/cm$^3$ and 50 parts of LHDPE having a density of 0.935 g/cm$^3$ was used for each of the surface layers S1 and S2. The results are summarized in Table 1.

Comparative Example 2

Example 1 was repeated in the same manner as described except that a resin composition containing 10 parts of LLDPE having a density of 0.920 g/cm$^3$ and 90 parts of LVLDPE having a density of 0.900 g/cm$^3$ was used for the intermediate layer M and that the thickness ratio S1:M:S2 was changed to 10:80:10. The results are summarized in Table 1.

Comparative Example 3

Example 1 was repeated in the same manner as described except that a resin composition containing 90 parts of LLDPE having a density of 0.920 g/cm$^3$ and 10 parts of LVLDPE having a density of 0.910 g/cm$^3$ was used for the intermediate layer M and that the thickness ratio S1:M:S2 was changed to 30:40:30. The results are summarized in Table 1.

Comparative Example 4

Example 1 was repeated in the same manner as described except that a resin composition containing 96 parts of LLDPE having a density of 0.920 g/cm$^3$ and 4 parts of LHDPE having a density of 0.930 g/cm$^3$ was used for each of the surface layers S1 and S2 and that the thickness ratio S1:M:S2 was changed to 10:80:10. The results are summarized in Table 1.

TABLE 1

| Example No. | $D_{CF1} - D_{AF1}$ | $D_{CF2} - D_{AF2}$ | $D_{AM} - D_{BM}$ | $Z_{S1} + Z_{S2}$ | $Z_M$ | Stability | Uniformity | Slippage |
|---|---|---|---|---|---|---|---|---|
| 1 | 0.015 | 0.015 | 0.02 | 0.045 | 0.42 | A | A | A |
| 2 | 0.015 | 0.015 | 0.02 | 0.135 | 0.42 | A | A | A |
| 3 | 0.015 | 0.015 | 0.02 | 0.045 | 0.98 | A | A | A |
| 4 | 0.015 | 0.015 | 0.02 | 0.18 | 0.98 | A | A | A |
| Cmp. 1 | 0.015 | 0.015 | 0.02 | 0.225 | 0.42 | C | C | A |
| Cmp. 2 | 0.015 | 0.015 | 0.02 | 0.03 | 1.44 | C | C | B |
| Cmp. 3 | 0.015 | 0.015 | 0.01 | 0.09 | 0.04 | C | C | A |
| Cmp. 4 | 0.01 | 0.01 | 0.02 | 0.008 | 0.48 | B | B | C |

LLDPE having a density of 0.920 g/cm$^3$ and 70 parts of LVLDPE having a density of 0.900 g/cm$^3$ was used for the intermediate layer M.

EXAMPLE 4

Example 3 was repeated in the same manner as described except that a resin composition containing 60 parts of LLDPE having a density of 0.920 g/cm$^3$ and 40 parts of LHDPE having a density of 0.935 g/cm$^3$ was used for each of the surface layers S1 and S2. The results are summarized in Table 1.

Comparative Example 1

Example 1 was repeated in the same manner as described except that a resin composition containing 50 parts of The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A heat shrinkable, coextruded polyethylene film laminate comprising two surface layers F1 and F2, and an intermediate layer M interposed therebetween, wherein the surface layer F1 comprises a linear low density polyethylene having a density $D_{AF1}$ g/cm³ of 0.910–0.930 g/cm³ and a linear high density polyethylene having a density $D_{CF1}$ g/cm³ of 0.925–0.945 g/cm³ and being present in an amount of $W_{CF1}$ % based on a total weight of the linear low density polyethylene having the density $D_{AF1}$ and the linear high density polyethylene having the density $D_{CF1}$, wherein the surface layer F2 comprises a linear low density polyethylene having a density $D_{AF2}$ g/cm³ of 0.910–0.930 g/cm³ and a linear high density polyethylene having a density $D_{CF2}$ g/cm³ of 0.925–0.945 g/cm³ and being present in an amount of $W_{CF2}$ % based on a total weight of the linear low density polyethylene having the density $D_{AF2}$ and the linear high density polyethylene having the density $D_{CF2}$, wherein the intermediate layer M comprises a linear low density polyethylene having a density $D_{AM}$ g/cm³ of 0.910–0.930 g/cm³ and a linear very low density polyethylene having a density $D_{BM}$ g/cm³ of 0.880–0.915 g/cm³ and being present in an amount of $W_{BM}$ % based on a total weight of the linear low density polyethylene having the density $D_{AM}$ and the linear very low density polyethylene having the density $D_{BM}$, and wherein the laminate film satisfies the following conditions (a) through (e) at the same time:

(a) $D_{CF1} - D_{AF1} \geq 0.010$,
(b) $D_{CF2} - D_{AF2} \geq 0.010$,
(c) $D_{AM} - D_{BM} \geq 0.010$,
(d) $0.01 \leq \{(D_{CF1} - D_{AF1}) \times L_{F1} \times W_{CF1}\} + \{(D_{CF2} - D_{AF2}) \times L_{F2} \times W_{CF2}\} \leq 0.20$
(e) $0.05 \leq (D_{AM} - D_{BM}) \times L_M \times W_{BM} \leq 1.40$, where $D_{CF1}$, $D_{AF1}$, $D_{CF2}$, $D_{AF2}$, $D_{AM}$, $D_{BM}$, $W_{CF1}$, $W_{CF2}$ and $W_{BM}$ are as defined above and $L_{F1}$, $L_{F2}$ and $L_M$ represent as follows:

$L_{F1} = t_{F1}/(t_{F1} + t_{F2} + t_M)$,
$L_{F2} = t_{F2}/(t_{F1} + t_{F2} + t_M)$,
$L_M = t_M/(t_{F1} + t_{F2} + t_M)$, where $t_{F1}$, $t_{F2}$ and $t_M$ represent the thicknesses of the surface layer F1, surface layer F2 and intermediate layer M, respectively.

2. A laminate film as recited in claim 1, and having a total thickness of 8–50 μm and wherein the thickness of each of the surface layers is 5–33% of the total thickness.

3. A laminate film as recited in claim 1, and satisfying the following conditions (d') and (e'):

(d') $0.04 \leq \{(D_{CF1} - D_{AF1}) \times L_{F1} \times W_{CF1}\} + \{(D_{CF2} - D_{AF2}) \times L_{F2} \times W_{CF2}\} \leq 0.12$, (e') $0.10 \leq (D_{AM} - D_{BM}) \times L_M \times W_{BM} \leq 0.30$, wherein $D_{CF1}$, $D_{AF1}$, $D_{CF2}$, $D_{AF2}$, $D_{AM}$, $D_{BM}$, $W_{CF1}$, $W_{CF2}$, $W_{BM}$, $L_{F1}$, $L_{F2}$ and $L_M$ are as defined above.

4. A laminate film as recited in claim 3, and having a total thickness of 8–50 μm and wherein the thickness of each of the surface layers is 5–33% of the total thickness.

5. A laminate film as recited in claim 1, and satisfying the following conditions (d') and (e'):

(d') $0.04 \leq \{(D_{CF1} - D_{AF1}) \times L_{F1} \times W_{CF1}\} + \{(D_{CF2} - D_{AF2}) \times L_{F2} \times W_{CF2}\} \leq 0.12$, (e') $0.70 \leq (D_{AM} - D_{BM}) \times L_M \times W_{BM} \leq 1.20$, wherein $D_{CF1}$, $D_{AF1}$, $D_{CF2}$, $D_{AF2}$, $D_{AM}$, $D_{BM}$, $W_{CF1}$, $W_{CF2}$, $W_{BM}$, $L_{F1}$, $L_{F2}$ and $L_M$ are as defined above.

6. A laminate film as recited in claim 5, and having a total thickness of 8–50 μm and wherein the thickness of each of the surface layers is 5–33% of the total thickness.

* * * * *

UNITED STATES PATENT AND TRADEMARK OFFICE
CERTIFICATE OF CORRECTION

PATENT NO. : 6,509,087 B2
DATED : January 21, 2003
INVENTOR(S) : Uehara et al.

It is certified that error appears in the above-identified patent and that said Letters Patent is hereby corrected as shown below:

Column 7,
Line 18, "DCF2," should read -- $D_{CF2}$ --.

Signed and Sealed this

Eighteenth Day of March, 2003

JAMES E. ROGAN
*Director of the United States Patent and Trademark Office*